United States Patent [19]
Lund

[11] Patent Number: 5,772,188
[45] Date of Patent: *Jun. 30, 1998

[54] SHOCK ABSORBER WITH ELASTOMERIC STRIP

[76] Inventor: Ronn A. Lund, 4701 Manytell Ave., Anchorage, Ak. 99516

[ * ] Notice: The term of this patent shall not extend beyond the expiration date of Pat. No. 5,613,665.

[21] Appl. No.: 811,115

[22] Filed: Mar. 3, 1997

Related U.S. Application Data

[63] Continuation of Ser. No. 556,210, Nov. 9, 1995, Pat. No. 5,613,665.

[51] Int. Cl.$^6$ ........................................................ F16F 1/00
[52] U.S. Cl. .............................................. 267/69; 267/72
[58] Field of Search ............................................ 267/69–74

[56] References Cited

U.S. PATENT DOCUMENTS

| | | |
|---|---|---|
| 3,653,677 | 4/1972 | Feser . |
| 3,917,426 | 11/1975 | Wohlwend et al. . |
| 4,389,066 | 6/1983 | Weir et al. . |
| 4,600,216 | 7/1986 | Burkholder . |
| 4,819,956 | 4/1989 | Campbell . |
| 5,054,800 | 10/1991 | Christensen et al. . |
| 5,242,176 | 9/1993 | Hendrickson . |
| 5,259,597 | 11/1993 | Fredheim .................................. 267/69 |
| 5,613,665 | 3/1997 | Lund ........................................ 267/69 |

OTHER PUBLICATIONS

Subject: Landing Gear Shock Disc Retrofit; Service Bulletin No. M20–139A, Mooney Aircraft Corporation, dated Jan. 10, 1967 and revised Mar. 10, 1982.

*Primary Examiner*—Matthew C. Graham
*Attorney, Agent, or Firm*—Glenn D. Bellamy; David P. Campbell

[57] ABSTRACT

A suspension component (300) has a pair of elongated slidably coupled in a telescoping arrangement. A pair of attachment plates (305, 306) are fixed to the respective suspension components (311, 314) inside an outer tube of one of the suspension components (314). An elastomeric section (303) is bonded to attachment plates (305, 306), so that collapsing the suspension components (311, 314) results in an extension of the elastomeric section (303). An adjustment mechanism is provided in the form of a rotatable threaded boss (316) mounted on one of the suspension components (314) and rotatably journaled to one of the attachment plates (306). Rotation of the suspension components causes attachment plate (306) to move axially along the length of the suspension component (314).

20 Claims, 9 Drawing Sheets

SHOCK ABSORBER WITH ELASTOMERIC STRIP

CROSS-REFERENCE TO RELATED APPLICATION

This is a continuation in part to U.S. patent application Ser. No. 8/556,210, filed Nov. 9, 1995, now U.S. Pat. No. 5,613,665.

TECHNICAL FIELD

The present invention pertains to shock absorbers, and more particularly, to a shock absorber adapted to replace a strut-type shock absorber or coil spring over shock.

BACKGROUND OF THE INVENTION

U.S. Pat. No. 4,600,216 of Burkholder, entitled "Vehicle Steering and Suspension System," discloses a three-wheeled vehicle steering and suspension system that includes, inter alia, a pair of bungee cords that resist rotation of the cylindrical tubular housing of a support wheel assembly for each main wheel. The bungee cords are a part of the vehicle's suspension and steering system and work in combination with a pair of shock absorbers to allow for independent suspension of the main wheels.

U.S. Pat. No. 5,054,800 of Christiansen et al., entitled "Bicycle Trailer for Small Children," discloses a bicycle trailer including a frame that is slidably mounted onto a main axle rotatably journaled between the two main wheels of the trailer. A pair of bungee cords are draped over the trailer axle and around a couple of bosses at the lower extremity of the trailer frame. The bungee cords resiliently join the axle to the trailer frame.

The foregoing two patents should be considered in order to put the present invention into a proper perspective. It is an object of the present invention to utilize the advantages achievable with elastomers in a suspension system that is self-contained and adapted for a variety of applications.

In one particular application, the present invention is designed to replace a strut-type shock absorber. For vehicles operating in cold weather conditions, oil-filled gas-charged shocks tend to heat up due to internal friction. This frequently occurs when the vehicle moves over rough terrain and at high speeds. The increased heat causes condensation to form on the inside of the cylinder and contaminates the oil with water. The result is a loss of performance from the shock absorber. This is a particular problem for snowmobiles where routine replacement and/or rebuild is required.

It has been proposed by the inventor in the parent patent application to use bungee cords in a shock absorption system. A bungee typically consists of a plurality of woven or parallel elastomeric strips which are bundled together. In addition, standard bungees have a limited shock absorption quality; that is, the ability of a bungee to dampen oscillations is limited.

In suspension systems in which a separate shock absorber is not used, it is desired that the elastic component reduce oscillations. In some cases, this is accomplished by mechanical friction, although such an arrangement often results in increased ride roughness.

In many cases, the dampening function of a damped suspension system is accomplished by reducing the rate of rebound of the spring. In other words, the dampening force exerted by a shock absorber may be less than the rebound force exerted by a spring, and yet the suspension is still adequately damped. This is particularly apparent in automotive suspension systems, in which the dampening effect may be 70% on extension and 30% on compression.

It is possible to obtain elastomers which have significant dampening function or characteristic. It is therefore desired to take advantage of such a property and provide a suspension system which utilizes such dampening elastomers.

Additionally, dirt bikes have gone to much larger cylinder capacity for their shock absorbers. The result is an increase in weight, which is not desirable. The present invention also is designed to address this problem.

DISCLOSURE OF THE INVENTION

According to the invention, a suspension mount has first and second suspension components coupled for telescoping movement between the two components. An elastomeric section is attached by bonding to attachment plates for restraining relative movement between the first and second suspension components. The attachment plates are arranged so that the elastomeric section resists axial movement of the first and second suspension components in an opposite direction so that a compressive movement of the suspension components toward each other results in a separation of the attachment units and thereby results in the elastomeric section biasing the mounting lugs apart in a tension mode. Likewise, extending movement of the suspension components away from each other results in a movement of the attachment units toward each other and thereby results in the elastomeric section biasing the mounting lugs together in compression.

One embodiment of the present invention comprises a shock absorber having an elongated first suspension component having an outer end for attachment to a first part of a vehicle, a second suspension component slidably coupled to the first suspension component, to allow for relative sliding movement between the two components along the axis of the elongated first suspension component, and an elastomeric strip for restraining relative movement between the first and second suspension components.

The second suspension component has an outer end for attachment to a second part of the vehicle that is adapted to move relative to the first part of the vehicle. The first suspension component has an inner end and elastomeric strip extends across one of the suspension components and engages the other suspension component.

The second suspension component has an attachment lug that is spaced axially from the inner end of the first suspension component. The opposite end loops of the elastomeric strip to the lug. The elastomeric strip restrains movement of the inner end of the first suspension component away from the lug, thereby resisting compression of the first and second suspension components.

According to an aspect of the invention, the second suspension component includes an adjustment mechanism for adjusting the position of the lug relative to the inner end of the first suspension component, to increase or decrease the tension in the elastomeric strip. Preferably, the adjustment mechanism comprises a threaded tube for slidably receiving the first suspension component, the threaded tube being rotatably journaled to the second suspension component. The lug is threaded onto the threaded tube. A bar located between the lug and the boss end is attached to the second suspension component. The bar provides lateral stability for the lower end of the threaded tube and prevents rotation of the lug as the threaded tube is rotated. This allows the lug to move along the length of the threaded tube, to adjust its position relative to the inner end of the first suspension component. The adjustment mechanism includes a handle for rotating the threaded tube.

According to another aspect of the invention, the second suspension component includes a casing for enclosing the elastomeric strip. The handle extends to the exterior of the casing, to allow for manual adjustment of the lug. The casing protects the elastomeric strip and the lug from the elements.

According to another aspect of the invention, the second suspension mechanism includes a bar to restrain rotation of the lug as the threaded tube is rotated, thereby allowing the lug to move along the length of the threaded tube, to adjust its position relative to the inner end of the first suspension component.

In an alternative embodiment, the second suspension component has an exterior threaded tube with end walls for slidably receiving the first suspension component. The lug is slidably mounted on the first suspension component within the threaded tube and between the end walls. The threaded tube of the second suspension component has a slot extending along a portion of its length and the lug has a laterally projecting prong extending through the slot. The second suspension component has a collar threaded onto the threaded tube between the laterally projecting prong and the first end of the first suspension component. The collar is rotated to adjust the position of the lug relative to the first end of the first suspension component.

According to an aspect of this alternative embodiment, the threaded tube includes a pair of slots on opposite sides of the tube, and the lug includes a pair of prongs adapted to project through the slots and engage the collar. In this manner, the tension in the elastomeric strip biased the prongs of the lug against the collar, thus fixing the position of the lug.

According to a preferred feature of the invention, the elastomeric strip is provided with a dampening property. This dampening property prevents the elastomeric strip from exerting a rebound force which is equivalent to the resistance of the elastomer for extension. This difference between rebound force and extension force results in a dampening of the elastomer, in that rebound energy is lost during any given oscillation. This dampening is chosen to be less than an anticipated maximum speed of oscillation, but is greater than an amount of energy which would be imparted by normal forward motion of a vehicle across rough terrain. This enables the suspension component to dampen oscillation without the requirement that a separate shock absorbing component be provided. Since the dampening effect is proportional to a speed of extension or rebound of the elastomer, excessive friction at times in which the suspension component exhibits reduced velocity of movement is reduced.

These and other features, advantages, and objects of the present invention will become apparent from the following detailed description of the best mode, when read in conjunction with the accompanying drawings, and the claims, which are all incorporated herein as part of the disclosure of the invention.

BRIEF DESCRIPTION OF THE DRAWINGS

Like reference numerals refer to like parts throughout the several views, wherein.

BEST MODE FOR CARRYING OUT THE INVENTION

Figure 1:
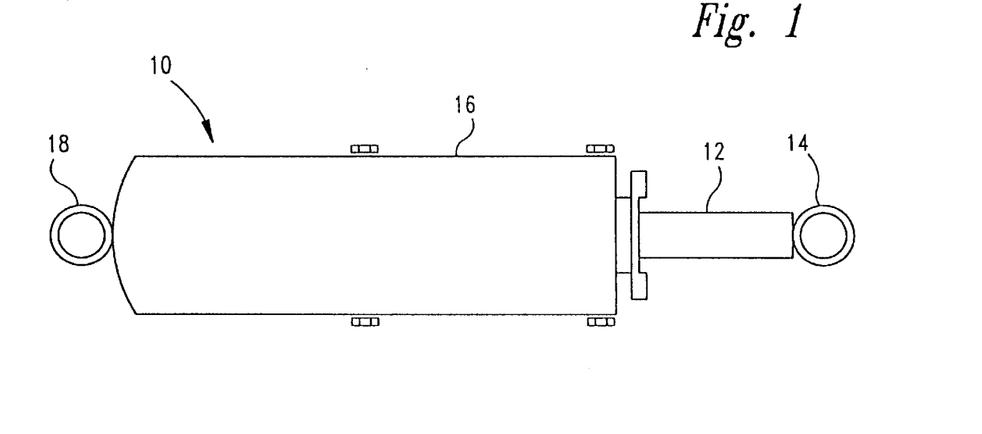
FIG. 1 is a side view of a first embodiment of the shock absorber of the present invention.
Figure 2:
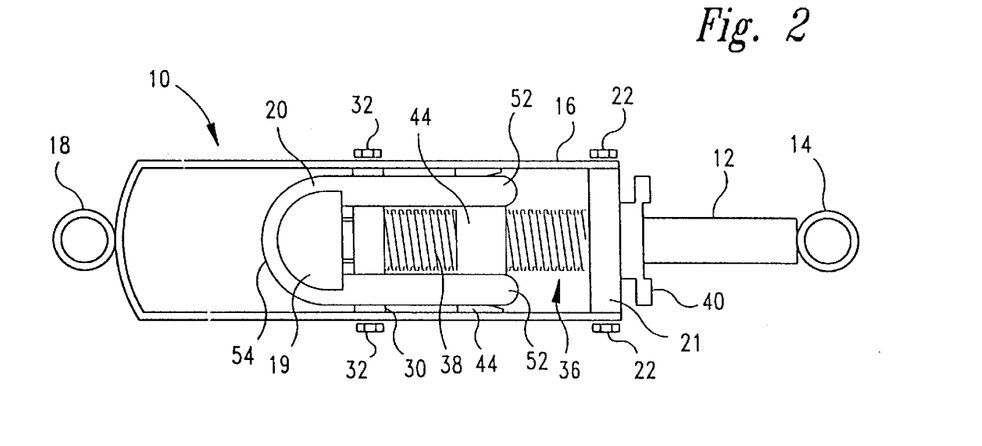
FIG. 2 is a cutaway view of the shock absorber of FIG. 1.
Figure 3:
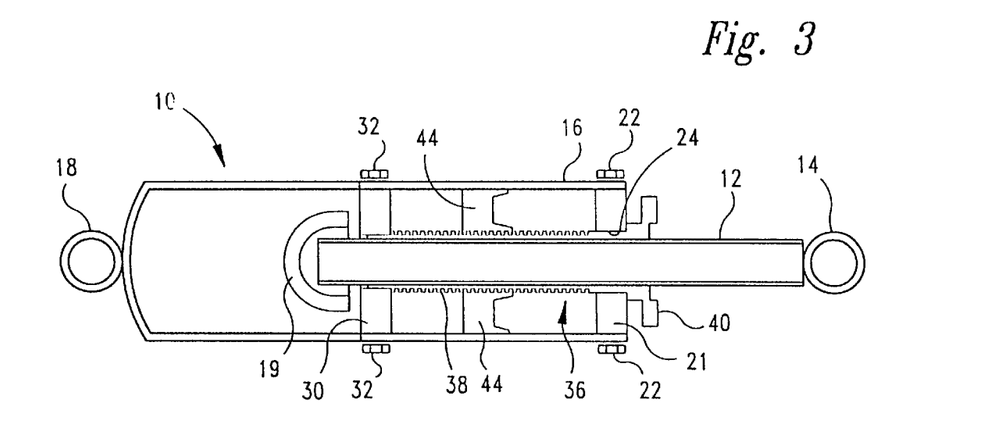
FIG. 3 is a cutaway view like FIG. 2 with the elastomeric strip removed.

A first embodiment for the present invention is shown in FIGS. 1–3. A shock absorber 10 is shown to include an elongated first suspension component in the form of a rod 12. Rod 12 includes an outer end 14 in the form of an eye. Eye 14 attaches to a first part of a vehicle in a manner well known in the art. Shock absorber 10 includes a second suspension component in the form of a tubular casing 16. Casing 16 has an outer end in the form of an eye 18 for attachment to a second part of a vehicle in a manner well known in the art. Relative movement between the first and second parts of the vehicle are cushioned by the shock absorber 10 of the present invention. Shock absorber 10 is designed to replace a conventional coil spring/strut-type shock absorber or may be mounted in other applications, such as in a seat chair, discussed later.

As shown in FIGS. 2 and 3, rod 12 has an inner end 19 in the form of a rounded boss for receiving an elastomeric strip 20. Tubular casing 16 includes an end wall 21 secured to casing 16 by bolts 22. Alternatively, a threaded end cap could be provided in lieu of end wall 21. End wall 21 includes an opening 24 for receiving rod 12. A stabilizer bar 30 is secured to casing 16 by bolts 32. Stabilizer bar 30 includes a central opening to receive and support rod 12.

Shock absorber 10 includes an adjustment mechanism 36 in the form of a threaded tube 38 rotatably journaled in end wall 21 and stabilizer bar 30. Threaded tube 38 includes a handle or knob 40 extending beyond end wall 21, to allow for manual rotation of threaded tube 38. Threaded tube 38 and handle 40 slidably receive rod 12 within casing 16 to allow for relative sliding movement between the first and second suspension components.

Adjustment mechanism 36 includes an annular lug 44 that is threadably attached onto tube 38. Lug 44 is an annular member with a constant diameter around tube 38. However, lug 40 could comprise a sleeve with a pair of lateral projections on opposite sides of rod 12. Either way, lug 38 includes lateral projections for receiving the loop ends of elastomeric strip 20. Lug 44 is spaced axially from the inner end 19 of rod 12.

Elastomeric strip 20 can be any type of resilient, flexible cord, such as a bungee cord. Elastomeric strip 20 is a continuous loop and includes a pair of loop ends 52, which wrap around the lateral projections of lug 44. Ends 52 define a mid section 54, which extends around the inner, boss end of rod 12. Elastomeric strip 20 restrains movement between the first and second suspension components and does so by applying forces on the first and second suspension components in an axial direction along their lengths so as to minimize placing any torques on the two suspension components. In this manner, wear and tear on the suspension components is minimized.

By rotating handle 40, and thereby rotating tube 38, lug 44 is moved along the length of tube 38 and does not rotate due to stabilizer bar 30. As lug 44 is adjusted along the length of tube 38, elastomeric strip 20 changes length and thereby changes the tension forces that it applies on the suspension components. By increasing or decreasing the tension in elastomeric strip 20, the shock absorber 10 can be preloaded to accommodate different loads and provide stiffer or softer suspension characteristics.

The arrangement of elastomeric strip 20 is such that the cord does not rub against itself, and friction with boss end 19 and lug 44 is minimized. Also, elastomeric strip 20 is protected from the elements by casing 16.

Alternatively, elastomeric strip 20 could be replaced with a pair of bungee cords, each having one of its ends attached directly to boss end 19 of rod 12 and its other end attached to lug 44. Both bungee cords would be shorter in length because they are not double looped. Boss end 19 would be rotated ninety degrees. With this alternative arrangement, the pair of bungee cords would provide tension in an axial direction, and would still function to bias the two suspension components into an extended position, and adjustment mechanism 38 would still operate to adjust the tension in elastomeric strip 20.

Figure 4:
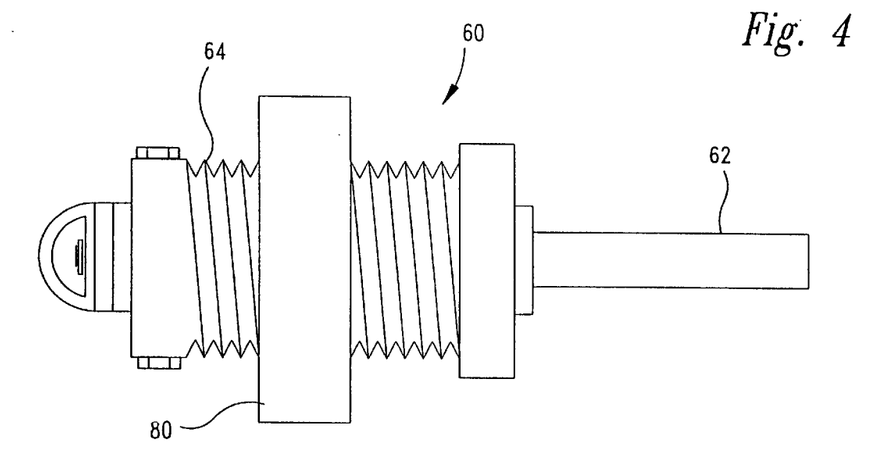
FIG. 4 is a side view of a second embodiment of a shock absorber of the present invention.
Figure 5:
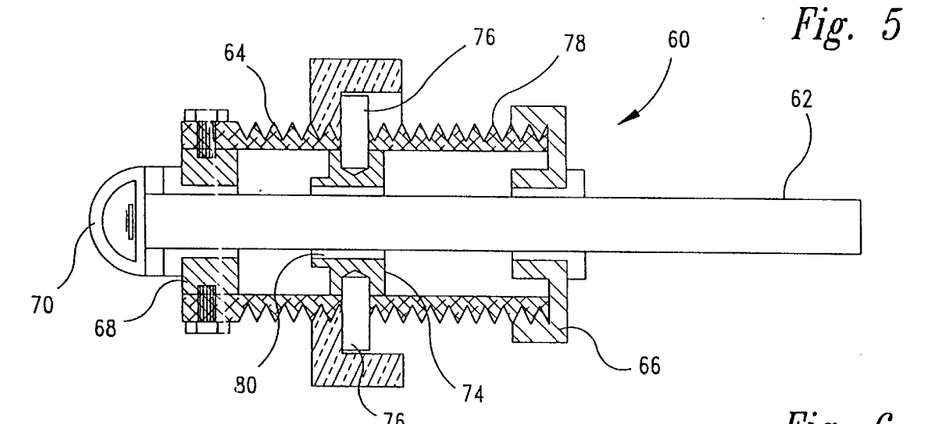
FIG. 5 is a cutaway view of the shock absorber of FIG. 4.
Figure 6:
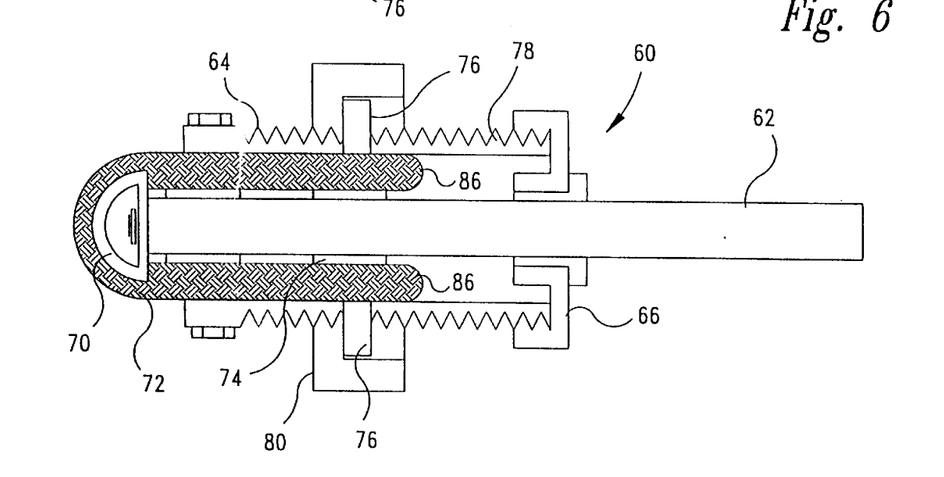
FIG. 6 is a cutaway view like FIG. 5 shown with the elastomeric strip.

An alternative embodiment for a shock absorber is illustrated in FIGS. 4–6. In this embodiment, a shock absorber 60 is shown to include an elongated first suspension component in the form of a rod 62 and a second suspension component in the form of a threaded tubular casing 64. Second suspension component 64 includes a pair of end walls 66, 68. End wall 68 is bolted to casing 64, and end wall 66 is threaded onto casing 64. Rod 62 is slidably coupled to second suspension component 64 through both end walls 66, 68. Rod 62 has a first end 70 in the form of a boss around which is extended an elastomeric strip 72. Elastomeric strip 72 is like cord 20 of FIGS. 1–3. An annular lug 74 slidably mounts within casing 64 around tube 62. Lug 74 includes a pair of prongs 76, which extend through longitudinal slots 78 in casing 64. Slots 78 extend along a portion of the length of casing 64 to accommodate axial movement of lug 74 and prongs 76. An annular collar 80 threadably mounts on the exterior of casing 64. Prongs 76 are adapted to extend through casing 64 and engage collar 80.

Elastomeric strip 72 includes a pair of ends 86, which wrap around annular lug 74. End wall 68 of second suspension component 64 includes a pair of openings for receiving the cord loops of elastomeric strip 72.

Adjustment of collar 80 along casing 64 moves lug 74 within casing 64 axially along the length of rod 62, and thereby increases or decreases the tension in elastomeric strip 72. Elastomeric strip 72 biases prongs 76 against collar 80 to fix in position lug 74 and to permit collar 80 to be rotated by application of a rotational force sufficient to overcome the frictional engagement in the threaded connection between collar 80 and tubular casing 64.

Preferably with this embodiment, elongated rod 62 attaches to the wheel or runner of a vehicle or trailer, and tubular casing 64 attaches to the frame of the vehicle or trailer. Elongated shaft 62 provides a range of travel for casing 64 limited only by the length of rod 62 and the degree of elasticity of cord loop 72.

Figure 7:
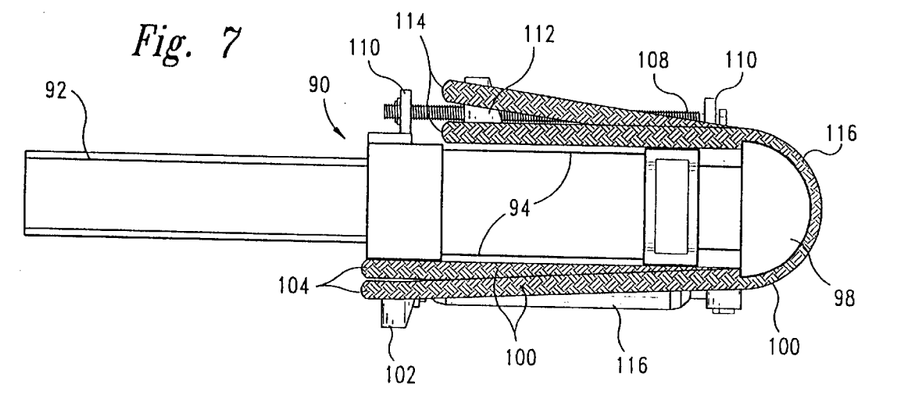
FIG. 7 is a side view of a third embodiment of the shock absorber of the present invention.
Figure 8:
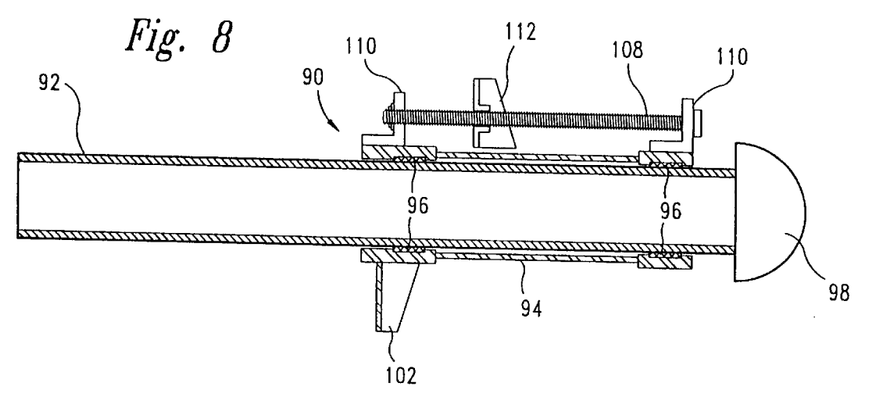
FIG. 8 is a cutaway view of the shock absorber of FIG. 7 with the elastomeric strip removed.
Figure 9:
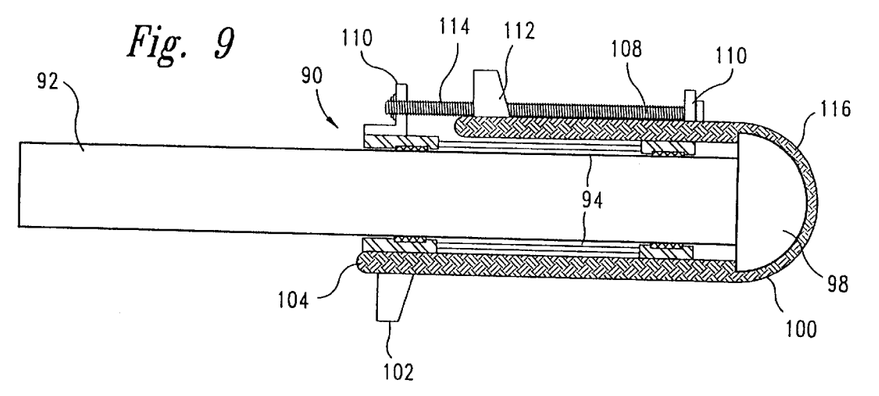
FIG. 9 is a cutaway view of the shock absorber of FIG. 7 with only one elastomeric strip shown.
Figure 10:
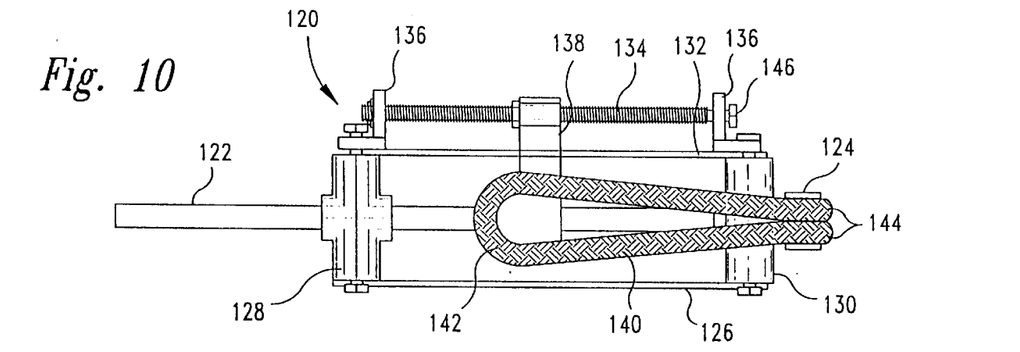
FIG. 10 is a side view of a fourth embodiment of the shock absorber of the present invention.
Figure 11:
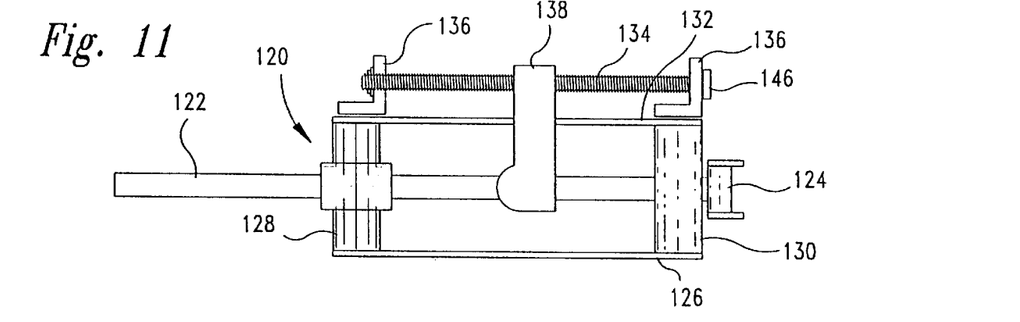
FIG. 11 is a cutaway view of the shock absorber of FIG. 10.
Figure 12:
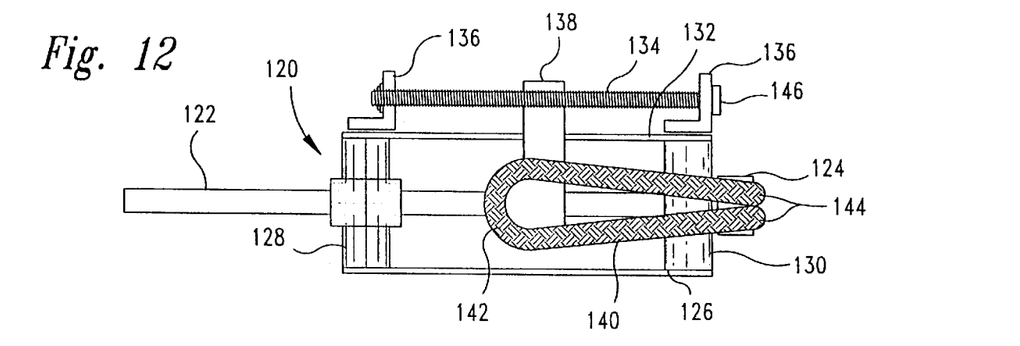
FIG. 12 is a cutaway view like FIG. 11 shown with an elastomeric strip.
Figure 13:
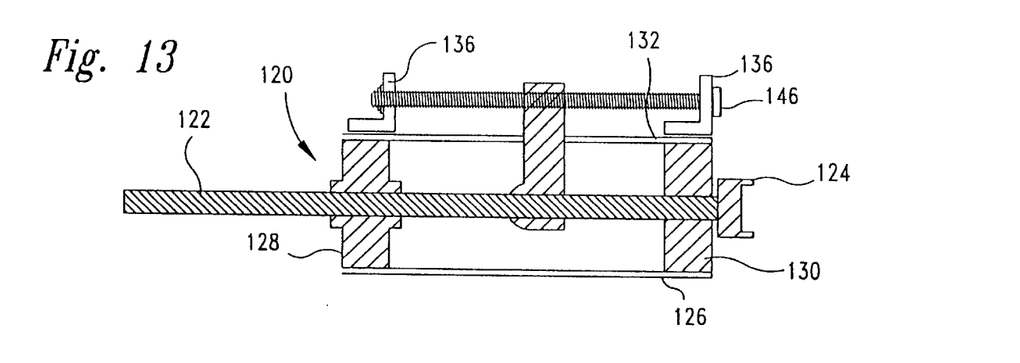
FIG. 13 is a cutaway view like FIGS. 11 and 12, with the elastomeric strip removed.

FIGS. 7–9 illustrate a third embodiment for a shock absorber 90. Shock absorber 90 includes a first suspension component in the form of a tubular rod 92 and a second suspension component in the form of a tubular sleeve 94. Tubular sleeve 94 slidably mounts onto rod 92 and includes a series of low friction bearings 96. Rod 92 includes a first end 98 in the form of a boss for receiving a pair of elastomeric strips 100. The embodiment of FIG. 9 has only one elastomeric strip 100. Tubular sleeve 94 has a first lug 102 mounted to one side of its end opposite boss 98. A first loop end 104 of each elastomeric strip 100 is wrapped around lug 102. Opposite lug 102 is mounted an external threaded rod 108. A pair of spaced brackets 110 carry threaded rod 108 and are themselves securely mounted to the second suspension component 94. A second adjustable lug 112 is rotatably threaded onto external threaded rod 108. Second lug 112 rotates independently of tubular sleeve 94 and independently of first lug 102.

Elastomeric strips 100 include second loop ends 114 that wraps around second lug 112. Loop ends 104, 114 of elastomeric strips 100 together define a midsection 116 that wraps around boss 98.

In this embodiment, elastomeric strips 100 are not protected by casing 94 from the elements, as with the prior embodiments, but can be more easily exchanged for different elastomeric strips that have more or less tension, to accommodate different loads.

Adjustment of second lug 112 along external threaded rod 108 moves second lug 112 axially along shock absorber 90 and increases or decreases the tension in elastomeric strips 100. The arrangement of elastomeric strips 100 around boss 98 and secured by first and second lugs 102, 112, provides resistance to relative movement between the first and second suspension components, which resistance is confined axially in the direction of relative movement between the components.

The shock absorber illustrated in FIG. 7 may also include an oil-filled piston/cylinder strut-type shock absorber 116. Strut 116 is secured at one end to second suspension component 94 and at its other end to rod 92 adjacent boss 98. Strut 116 is not illustrated in FIGS. 8 or 9.

FIGS. 10–13 illustrate a fourth embodiment, which combines features from both the embodiments of FIGS. 4–6 and FIGS. 7–9. In this alternative embodiment, shock absorber 120 includes a first suspension component in the form of an elongated rod 122 having a first end in the form of a boss 124, and a second suspension component in the form of a tubular casing 126. Tubular casing 126 includes a pair of end walls 128, 130. End walls 128, 130 slidably mount casing 126 onto elongated rod 122. Tubular casing 126 includes an elongated slot 132 extending along a portion of the length of tubular casing 126. An external threaded rod 134 is rotatably held by a pair of spaced brackets 136. Brackets 136 are secured to tubular casing 126.

An adjustment mechanism 138 in the form of an adjustable lug threadably mounts to external threaded rod 134 and extends through slot 132 into the interior of tubular casing 126. Within casing 126, lug 138 slidably couples to elongated rod 122. An elastomeric strip 140 includes a pair of loop ends 142 (only one shown), which wrap around opposite sides of lug 138. Loop ends 142 define a midsection 144 of elastomeric strip 140. Midsection 144 wraps around boss 124.

To adjust lug 138, threaded rod 134 is rotated, preferably by means of a tool applied to the threaded rod head 146 of rod 134. Rotation of external threaded rod 134 causes lug 138 to move within slot 132 along rod 122 toward and away from boss 124. In this manner, the tension in elastomeric strip 140 is decreased or increased.

Figure 14:
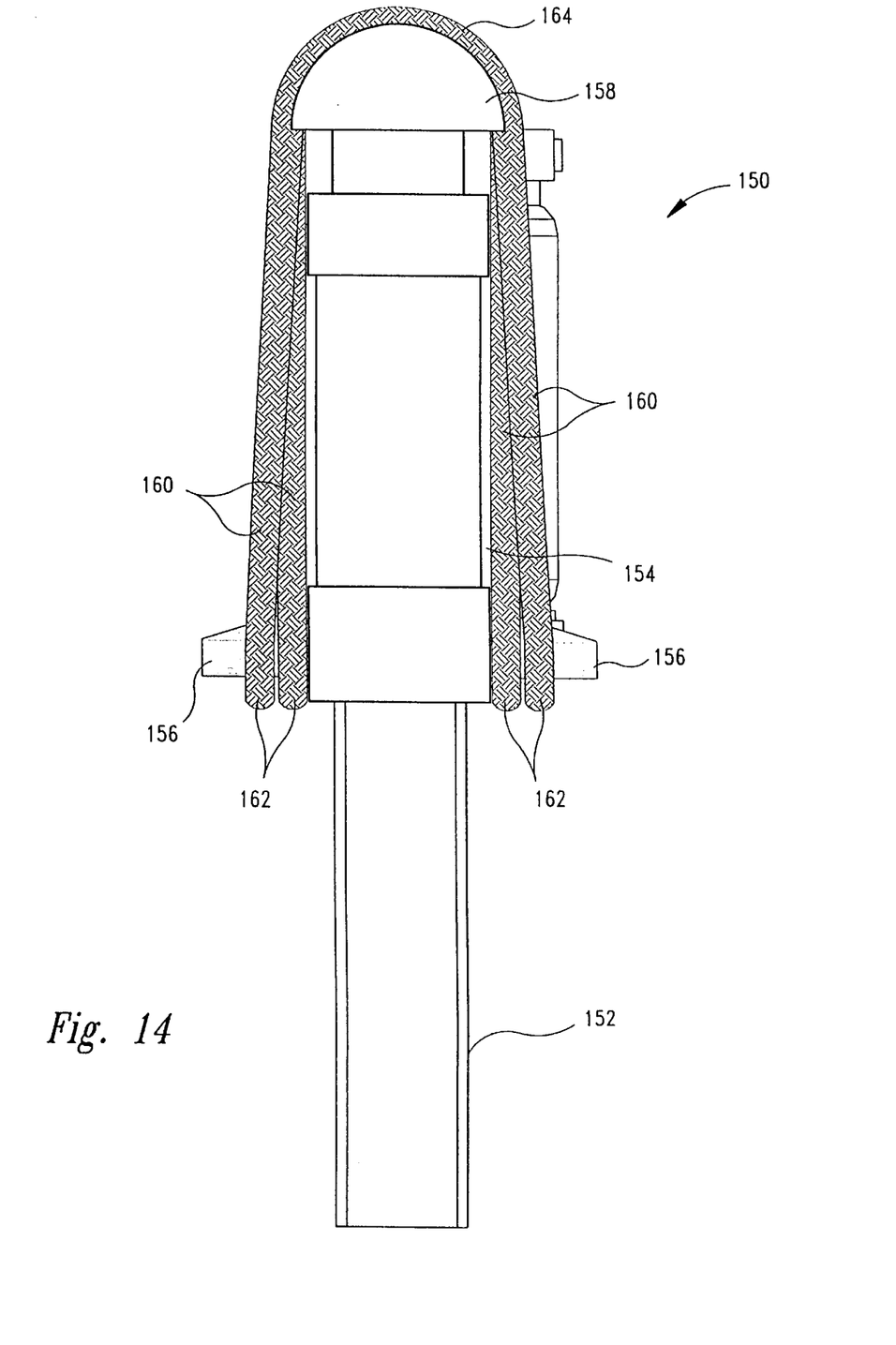
FIG. 14 is a side view of a fifth embodiment of the shock absorber of the present invention.

FIG. 14 shows another alternative embodiment similar to that of FIGS. 10–13. Shock absorber 150, in this embodiment, does not include an adjustment mechanism. A first suspension component 152 and a second suspension component 154 are slidably coupled together. Second suspension component 154 includes a pair of lugs 156 fixedly secured thereto. First suspension component 152 includes a boss end 158. A pair of elastomeric strips 160 each have loop ends 162 that wrap around lugs 156, and define a midsection 164 that wraps around boss 158.

An adjustment mechanism can be provided with this embodiment by providing a pair of additional lugs, spaced axially from lugs 156, and secured to second suspension component 154. Adjustment is made manually be re-looping cords 160 around the additional lugs. Also, bungee cord sizes can be changed to adjust tension.

In this embodiment, an additional dampening mechanism in the form of an oil-filled piston/cylinder shock absorber 166 is provided. Shock absorber 166 is secured at one end to second suspension component 154, and at its other end to the boss end 158 of first suspension component 152. Shock absorber 166 works in conjunction with elastomeric strip 160 to control relative movement between the first and second suspension components.

Figure 15:
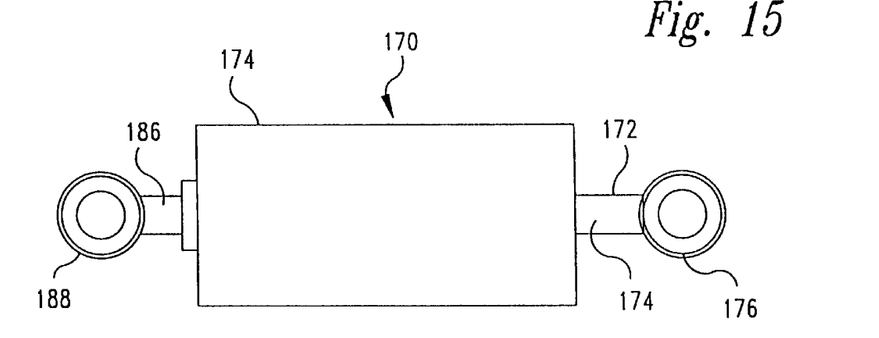
FIGS. 15, 16 and 17 illustrate a sixth embodiment of the shock absorber of the present invention.
Figure 16:
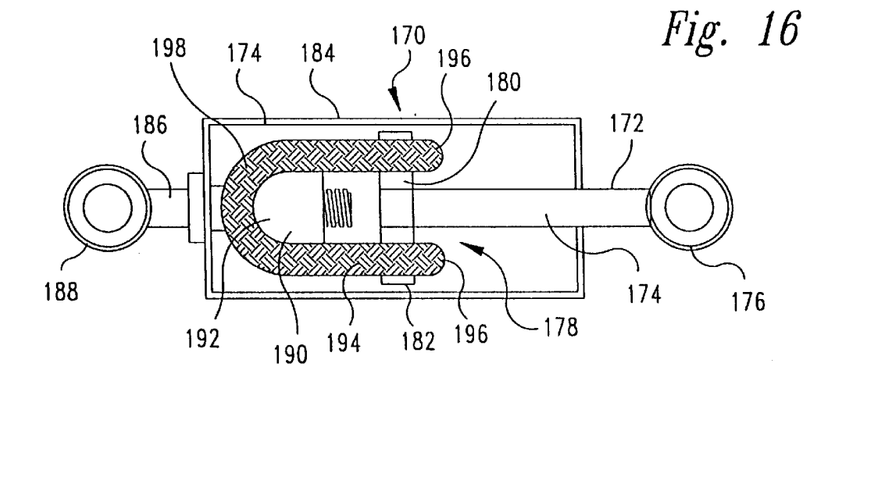
Figure 17:
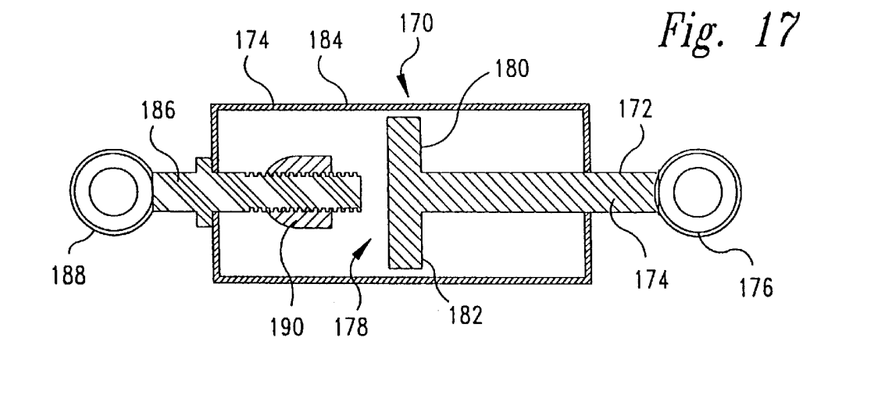

FIGS. 15–17 show another alternative embodiment of the shock absorber of the present invention. The shock absorber 170 includes a first suspension component 172 and a second suspension component 174. First suspension component 172 includes an elongated rod 174 with an eyelet 176 attached at one end. Elongated rod 174 includes a T-shaped inner end 178. Inner end 178 includes a pair of lateral prongs 180, 182.

Second suspension component 174 includes a tubular casing 184 and a shortened threaded rod 186. An eyelet 188 is secured to one end of rod 186. Rod 186 is rotatably mounted in casing 184. An internally-threaded adjustable lug 190 is threadably mounted onto threaded rod 186. Lug 190 includes a pair of bosses 192 (only one shown in FIG. 16) on either side of rod 186.

An elastomeric strip 194 includes a pair of loop ends 196 that define between them a midsection 198. Loop ends 196 wrap around prongs 180, 182, and midsection 198 wraps around bosses 192 of adjustable lug 190. Manual adjustment of lug 190, by rotation of bar 186, along threaded rod 186 changes the tension in elastomeric strip 194.

In this embodiment, elastomeric strip 194 restrains movement of first suspension component 172 and second suspension component 174 away from each other. Shock absorber 170 thus acts as a pull rod, rather than a push rod. Casing 184 encloses elastomeric strip 194, thereby protecting the cord from the elements. Casing 184 is shown in the figures in somewhat schematic form. The end of casing 184 adjacent eyelets 176 preferably should be provided with a removable end cap to provide access to elastomeric strip 194.

Figure 18:
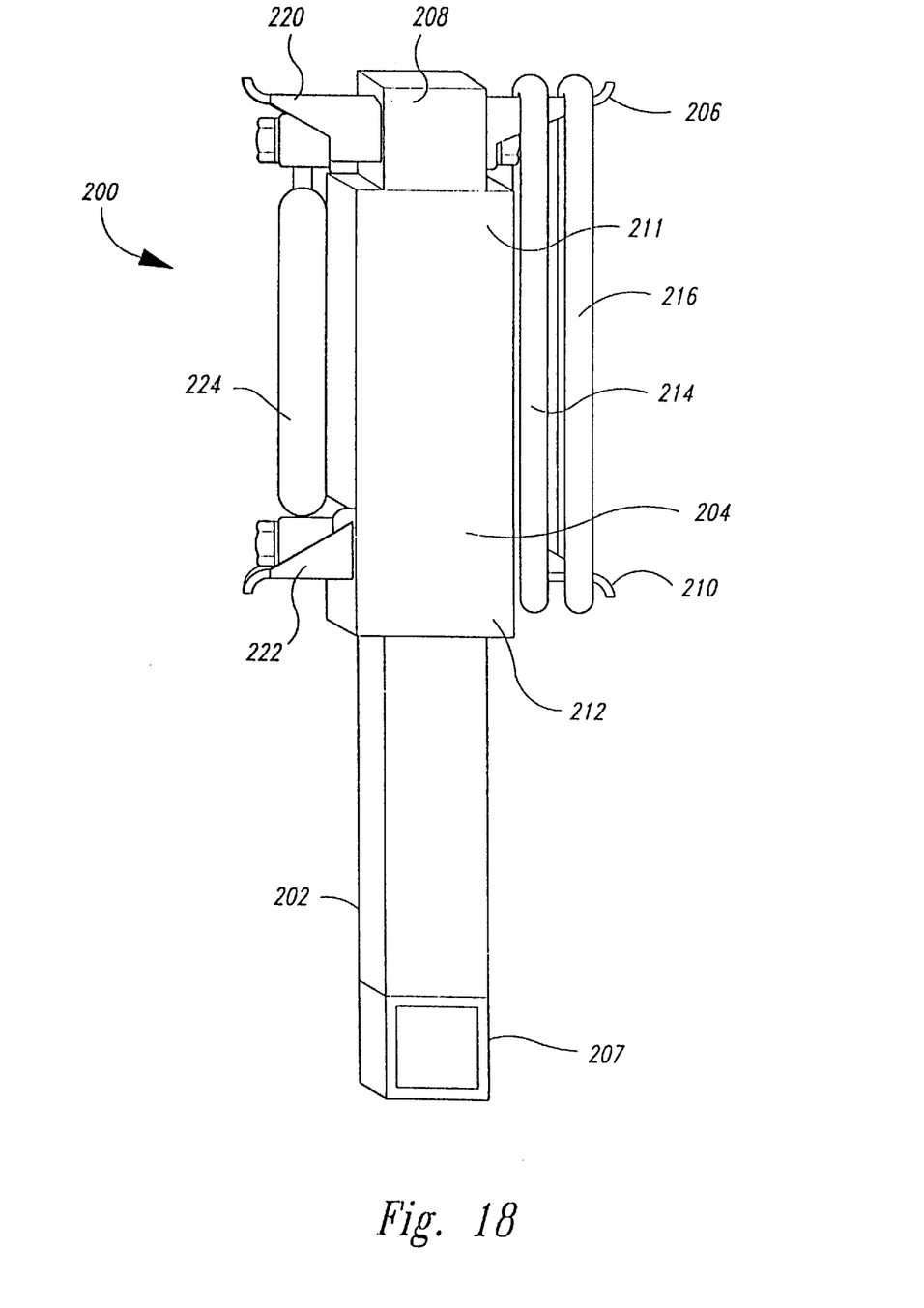
FIG. 18 illustrates a seventh embodiment of the shock absorber of the present invention.

FIG. 18 is another embodiment of a shock absorber 200 that is similar in many respects to the shock absorber of FIG. 14. Shock absorber 200 includes a first suspension component 202 in the form of a square bar, and a second suspension component 204 in the form of a tubular sleeve. Sleeve 204 slides on bar 202. First suspension component has an outer end 207 and an inner end 208. First suspension component 202 includes a lug 206 at its inner end 208. Second suspension component 204 has an upper end 211 and a lower end 212. Second suspension component 204 includes a similar lug 210 at its lower end 212. A pair of elastomeric strips 214, 216 are entrained around lugs 206, 210.

First suspension component 202 includes a bracket 220 at its inner end 208, and second suspension component 204 includes a bracket 222 at its lower end 212. A gas or oiled filled strut 224 is secured at its ends to brackets 220, 222. Strut 224 is secured at its ends to brackets 220, 222. Strut 224 operates in conjunction with elastomeric strips 214, 216 to control compression of the suspension components, that is movement of outer end 207 toward lug 210.

The shock absorber illustrated in the several embodiments and discussed herein is designed to replace a conventional strut-type coil spring shock absorber used on many vehicles. Additionally, the shock absorber of the present invention, in any of its embodiments, could also be used in a variety of other applications. For example, the shock absorber could be mounted between a stem and a seat on a bicycle or a chair. The shock absorber could also be used on vehicles that have runners instead of wheels, such as sleds, trailers, or snowmobiles. In general, the shock absorber can be used to cushion relative movement between any two parts, and is not meant to be limited to any particular application discussed herein or otherwise.

Bungee cords weigh a fraction of the weight of steel or even alloy coil springs that provide the suspension for conventional shock absorbers. The casing of the present invention does not have to be of a heavy weight material because the bungee cord is carrying the load. In addition, the shock absorber of the present invention generates an insignificant amount of friction heat, and if any condensation should occur, it would have little affect on the performance of the shock absorber. Thus, the present invention should perform the same function as an oil-filled gas-charged shock and coil spring and achieve this function with less weight added to the vehicle. The present invention should also be more dependable and require less maintenance.

Figure 19:
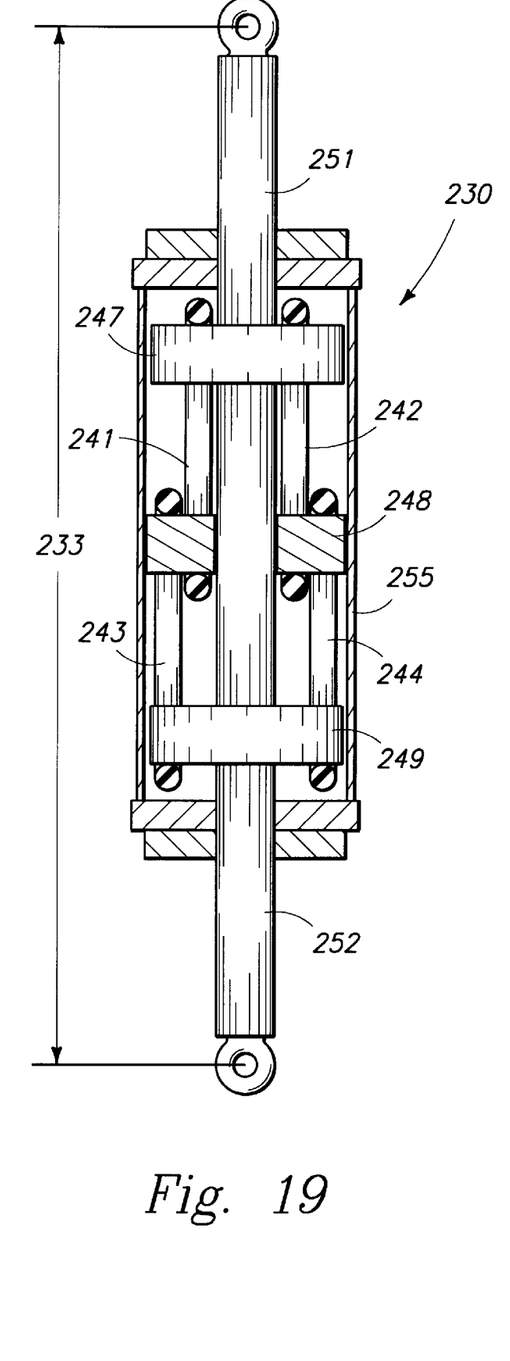
FIG. 19 shows a configuration of the invention configured for a neutral rest position.

Referring to FIG. 19, a shock absorber 230 is configured as a Vibration dampener. The vibration dampener 230 can be either load bearing or non-load bearing. In either case, a neutral position 233 is provided as shown in FIG. 19, with extension or retraction of the vibration dampener 230 resulting in force toward the neutral position 233. Two sets of elastomeric members 241–244 are mounted to lugs or mounting bosses 247–249 in a manner which permits the most relaxed position of the aggregation of the biasing forces of the elastomeric members 241–244 to coincide with the neutral position. Elastomeric members 241 and 242 link top lug 247 and center lug 248, and elastomeric members 243 and 244 link center lug 248 and bottom lug 249. The reference to top and bottom are by way of reference only, since there is no restriction on the mounting position of the vibration dampener 230 with respect to a horizontal plane.

In the configuration shown, lugs 247 and 249 are attached to rods 251 and 252. It is possible to have any other configuration which results in the neutral biasing of the vibration dampener 230. Likewise, in the configuration shown, any of lugs 247–249 can carry an outer housing 255, should one be provided, or outer housing 255 may be frictionally attached and slidable with one or more of the lugs 247–249.

Figure 20:
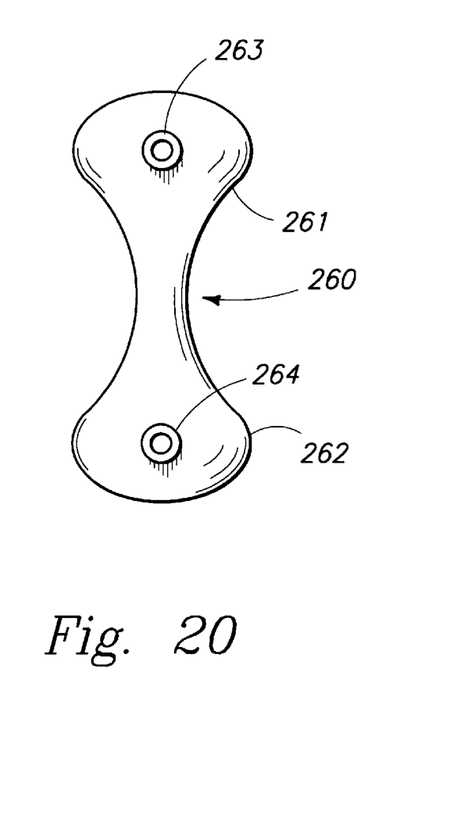
FIG. 20 is a molded piece used as an elastomeric suspension component.

FIG. 20 shows a molded piece 260 used as an elastomeric suspension component, which may be substituted for bungee loops and used in place of elastomeric strips 20, 72, 100, 140, 160, 194, 214 and 216, or elastomeric members 241–244. The molded piece includes two ends 261, 262 with apertures 263, 264, and a center section 266.

Figure 21:
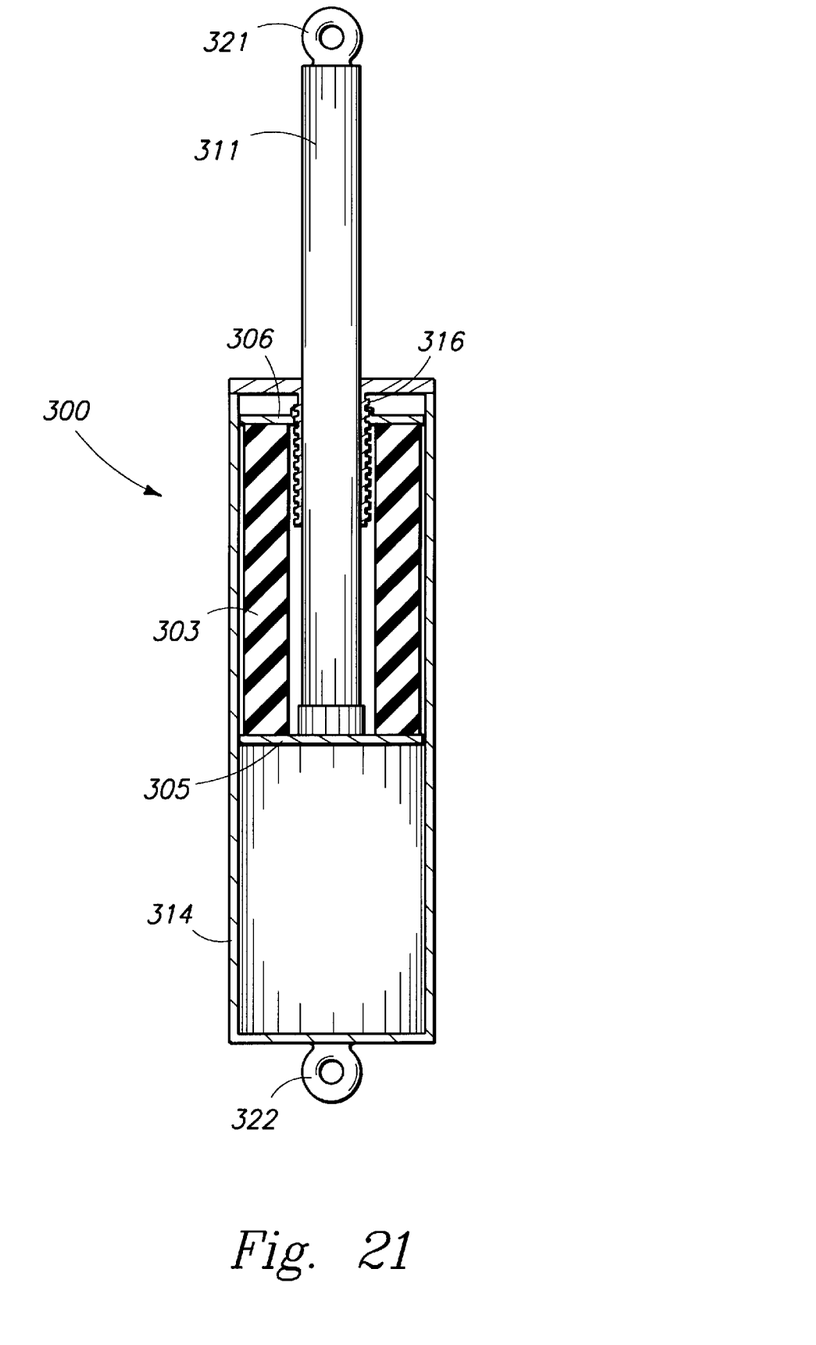
FIG. 21 shows a configuration in which an elastomer is bonded to two attachment plates.

FIG. 21 shows a suspension component 300, in which an elastomer 303 is bonded to a pair of attachment plates 305, 306. A rod 311 is attached to a first one of the attachment plates 305. A cylinder member 314 is connected to a second one of the attachment plates through a threaded boss 316. The attachment plates 305, 306, the rod 311 and cylinder member 314 are configured so that a compression of mounting ends 321, 322 results in the elastomer 303 being extended.

This configuration in which the elastomer 303 is extended during compression of the suspension component 300 provides a favorable range of operation of the suspension component 300. In addition, the suspension component 300 has a position in which the elastomer 303 is in a relaxed state, so that it is possible to use the suspension component 300 as a vibration dampener, in which the mounting ends 321, 322 are biased in both compression and extension.

The threaded boss 316 permits adjustment of the suspension component 300. By turning the mounting ends 321, 322 relative to one another, the position of attachment plate 306 relative to the cylinder member 314 can be adjusted. The elastomer 303 maintains the rotational relationship of the two attachment plates to one another, so that attachment plate 306 is caused to rotate with respect to the cylinder member 314 when the cylinder member 314 turns. It is alternatively possible to permit the mounting boss 316 to be rotated with respect to the cylinder member 314, thereby permitting adjustment of the position of attachment plate 306 without rotating the mounting end 322.

In the claims that follow, it should be understood that the second suspension component includes an outer end or attachment lug for attachment to one of the moving components of a vehicle or other apparatus. The outer end does not necessarily have to be the portion of the second suspension component farthest from the inner end of the first suspension component. Rather, the outer end can be any portion of the second suspension component capable of attachment to the vehicle.

It is to be understood that many variations in size, shape, and construction can be made to the illustrated and above-described embodiment without departing from the spirit and scope of the present invention. Some of the features of the preferred embodiment may be utilized without other features. It is also possible to add other features, such as springs and other types of shock absorbers. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalents and reversal of parts.

What is claimed is:

1. A combination shock absorber and suspension mount, comprising:

a) a first suspension component having inner and outer ends, a mounting lug for attachment to a first part of a vehicle, and a first attachment unit;

b) a second suspension component slidably coupled to the first suspension component to allow for telescoping movement between the two components along an axis of the first suspension component, the second suspension component having a second attachment unit, and a second mounting lug for attachment to a second part of the vehicle adapted to move relative to the first part of the vehicle; and c) an elastomeric section attached to said attachment units for restraining relative movement between the first and second suspension components, with a midsection of the elastomeric section extending between the attachment units, whereby the elastomeric section restrains movement of the first attachment unit with respect to the second attachment unit by biasing the attachment units to a neutral position and thereby resists axial movement of the first and second suspension components in an opposite direction so that a compressive movement of the mounting lugs toward each other results in a separation of the attachment units and thereby results in the elastomeric section biasing the mounting lugs apart in a tension mode of the elastomeric section and extending movement of the mounting lugs away from each other results in a movement of the attachment units toward each other and thereby results in the elastomeric section biasing the mounting lugs together in a compression mode of the elastomeric section.

2. The combination shock absorber and suspension mount of claim 1, wherein one of the first and second suspension components includes an adjustment mechanism for adjusting the position of one of the attachment units relative to an inner end of the first suspension component.

3. The combination shock absorber and suspension mount of claim 2, wherein the adjustment mechanism comprises a threaded tube for slidably receiving the first suspension component, the second attachment unit threaded onto the threaded tube, the elastomeric section restraining rotation of said attachment unit as the threaded tube is rotated, thereby allowing said attachment unit to move along the length of the threaded tube, to adjust its position relative to the inner end of the first suspension component.

4. The combination shock absorber and suspension mount of claim 2, wherein the adjustment mechanism comprises a threaded tube for slidably receiving the second suspension component, the first attachment unit threaded onto the threaded tube, the elastomeric section restraining rotation of said attachment unit as the threaded tube is rotated, thereby allowing said attachment unit to move along the length of the threaded tube, to adjust its position relative to the inner end of the first suspension component.

5. The combination shock absorber and suspension mount of claim 4, wherein the second suspension component includes a structural casing for enclosing the elastomeric section.

6. The combination shock absorber and suspension mount of claim 5, wherein the adjustment mechanism includes a the structural casing, wherein rotation of the exterior of the casing effects adjustment of said attachment unit.

7. A suspension mount, comprising:

a) a first suspension component having inner and outer ends and an mounting lug for attachment to a first part of a vehicle, and including a first attachment plate mounted normal to an axis of the first suspension component and spaced axially between the inner and outer ends;

b) a second suspension component slidably coupled to the first suspension component to allow for telescoping movement between the two components along the axis of the first suspension component, the second suspension component including a second mounting lug for attachment to a second part of the vehicle adapted to move relative to the first part of the vehicle, and a second attachment plate mounted normal to the axis of the first suspension component; and c) an elastomeric section for restraining relative movement between the first and second suspension components, ends of the elastomeric section bonded to said first and second suspension components at said attachment plates, with a midsection of the elastomeric section extending between the attachment plates, whereby the elastomeric section restrains movement of the first attachment plate away from the second attachment plate by biasing the attachment plates toward each other and thereby resists compression of the first and second suspension components and a compressive movement of the mounting lugs toward each other results in a separation of the attachment plates and thereby results in the elastomeric section biasing the mounting lugs apart in a tension mode of the elastomeric section.

8. The suspension mount of claim 7, wherein one of the first and second suspension components includes an adjustment mechanism for adjusting the position of the second attachment plate relative to an inner end of the first suspension component.

9. The suspension mount of claim 8, wherein the adjustment mechanism comprises a threaded tube for slidably receiving the second suspension component, the threaded tube rotatably journaled to the first suspension component.

10. A suspension mount, comprising:

a) an elongated first suspension component;

b) a second suspension component slidably coupled to the first suspension component to allow for relative sliding movement between the two components along an axis of the elongated first suspension component;

c) an elastomeric strip for restraining relative movement between the first and second suspension components, the elastomeric strip having a pair of mounting ends;

d) a support on one of the first suspension component for flexibly mounting the mounting ends of the elastomeric strip; and e) the second suspension component including a lug at a location spaced axially from the first end of the first suspension component, the elastomeric strip being flexibly mounted between said mounting ends on the lug;

whereby the elastomeric strip restrains movement between the first and second suspension components.

11. The suspension mount of claim 10, wherein one of the first and second suspension components includes an adjustment mechanism for adjusting the position of the lug relative to the first end of the first suspension component, to increase or decrease the tension in the elastomeric strip.

12. The suspension mount of claim 11, wherein the adjustment mechanism comprises a threaded tube for slidably receiving the first suspension component, the lug threaded onto the threaded tube, thereby allowing the lug to move along the length of the threaded tube, to adjust its position relative to an inner end of the first suspension component.

13. The suspension mount of claim 10, wherein the second suspension component includes a casing for enclosing the elastomeric strip.

14. The suspension mount of claim 10, wherein the ends of the elastomeric strip are connected to the lug and the midsections of the elastomeric strip extend around an inner end of the first suspension component.

15. The suspension mount of claim 10, wherein the elastomeric strip has a pair of loop ends for restraining relative movement between the first and second suspension components, the first suspension component having a first end around which the elastomeric section extends, and wherein the loop ends flexibly extend around the lug, and wherein the second suspension component includes a threaded tube with end walls for slidably receiving the first suspension component, the lug being slidably mounted on the first suspension component within the threaded tube and between the end walls.

16. The suspension mount of claim 10, wherein:

a) the second suspension component includes a tubular casing, and wherein the first suspension component has a first end and the elastomeric section has opposite ends defining a midsection, the midsection extending around the first end;

b) the second suspension component including first and second lugs at a location spaced axially from the first end of the first suspension component, the ends of the elastomeric section wrapped around the first and second lugs;

c) the second suspension component including an external threaded rod mounted to the exterior of the tubular casing;

d) at least one of the first and second lugs threadably coupled to the threaded rod, so that one of the lugs is adjustable relative to the first end of the first suspension component, to adjust the tension in the elastomeric section.

17. The suspension mount of claim 10, comprising:

a) an elongated first suspension component;

b) a third suspension component slidably coupled to the first suspension component to allow for relative sliding movement between the two components along an axis of the elongated first suspension component;

c) a second elastomeric strip for restraining relative movement between the second and third suspension components, the elastomeric strip having a pair of mounting ends;

d) a support on one of the second and third suspension components for flexibly mounting the mounting ends of the second elastomeric strip; and e) the one of the second and third suspension components including a lug, the second elastomeric strip flexibly mounted between said mounting ends on said lug;

whereby extension of the suspension mount causes one of said elastomeric strips to extend from a neutral position and compression of the suspension mount causes the other of said elastomeric strips to extend from the neutral position.

18. The suspension mount of claim 17, wherein one of the first and second suspension components includes an adjustment mechanism for adjusting the position of the lug relative to the first end of the first suspension component, to increase or decrease the tension in the elastomeric strips.

19. A suspension mount, comprising:

a) an elongated first suspension component having an outer end for mounting to a wheel or runner of a vehicle, and the first suspension component including a first attachment unit;

b) a second suspension component slidably coupled to the first suspension component to allow for relative sliding movement between the two components along an axis of the elongated first suspension component, the second suspension component adapted for mounting to a frame of the vehicle;

c) the first suspension component having an inner end, and the second suspension component including a second attachment unit at a location spaced axially between the inner and outer ends of the first suspension component; and d) an elastomeric section with ends attached to said attachment units for restraining relative movement between the first and second suspension components, with a midsection of the elastomeric section extending between the attachment units, whereby the elastomeric strip restrains movement of the inner end of the first suspension component away from the attachment unit and thereby resists compression of the first and second suspension components.

20. The suspension mount of claim 19, wherein one of the first and second suspension components includes an adjustment including a threaded tube for slidably receiving the other suspension component, the threaded tube rotatably journaled to the said one of the first and second suspension components, one of the attachment units threaded onto the threaded tube, the elastomeric section restraining rotation of said attachment unit as the threaded tube is rotated, thereby allowing said attachment unit to move along the length of the threaded tube, to adjust its position relative to said one of the first and second suspension components.

* * * * *